United States Patent [19]

Watras

[11] Patent Number: 4,990,407

[45] Date of Patent: Feb. 5, 1991

[54] CEILING TILE COMPOSITE

[76] Inventor: Edward W. Watras, P.O. Drawer P, Deer Park, N.Y. 11729

[21] Appl. No.: 376,889

[22] Filed: Jul. 6, 1989

[51] Int. Cl.⁵ .................. B32B 17/06; B32B 19/04; B32B 27/04
[52] U.S. Cl. ........................... 428/426; 428/306.6; 428/415; 428/498; 428/438; 428/440; 428/912.2; 428/920
[58] Field of Search ............ 428/912.2, 415, 920, 428/438, 440, 441, 419, 306.6, 326, 498; 248/467

[56] References Cited

U.S. PATENT DOCUMENTS 4,726,860  2/1988  Leach .................... 428/912.2
4,756,955  7/1988  Rias ..................... 428/920

Primary Examiner—Thurman K. Page
Assistant Examiner—Amy Hulina
Attorney, Agent, or Firm—Robert S. Stoll

[57] ABSTRACT

A construction of an element adapted to provide fire-resistant support for a relatively fragile and relatively heavy decorative glass member, the construction converting that element into a structural element having in bonded combination a water-felted mineral fiberboard panel, a glass mirror, and a latex-, rubber-base or epoxy waterproof adhesive, the combination being edge-supported on a hung gridwork.

4 Claims, 1 Drawing Sheet

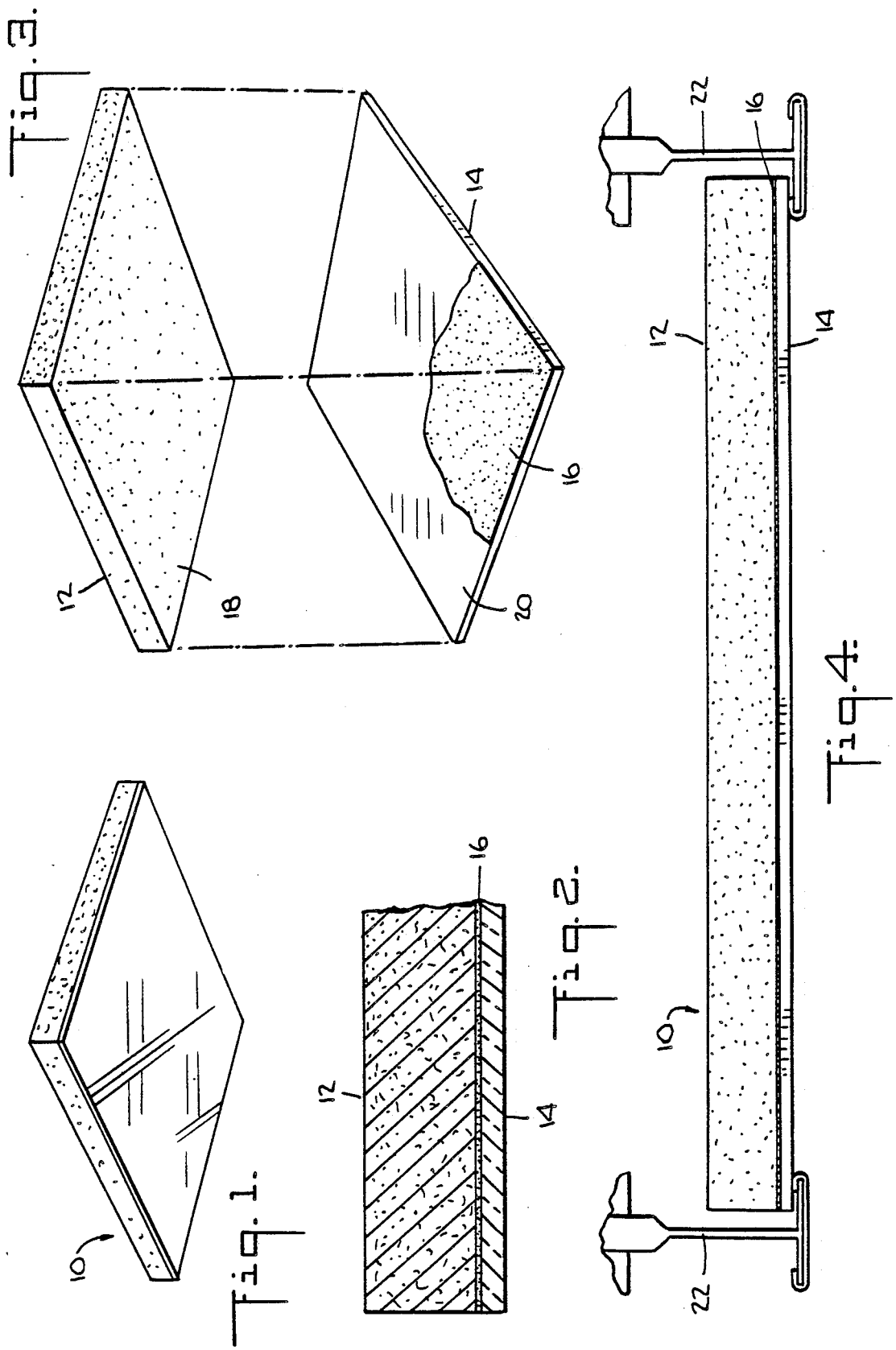

CEILING TILE COMPOSITE

REFERENCE TO RELATED DOCUMENT

Reference is made to Disclosure Document No. 197,611, filed July 26, 1988, in connection with the present invention.

SUMMARY OF THE INVENTION

Mirrored ceiling and wall surfaces may be decoratively appealing, but heretofore they have presented structural and construction problems. If the mirror is to be glass, as is generally preferred, weight is a significant disadvantage, particularly in ceilings where it is difficult to handle large glass panels during installation and difficult to provide adequate structural support. Smaller glass mirrors, in the form or size of tiles, reduce the weight problem of each individual piece, but at least two significant problems remain. First, glass mirrors are not good acoustical absorbers, and therefore yield higher than necessary sound levels where used. Second, glass mirrors generally crack under heat and heretofore have been quite unacceptable where fire-resistant construction is desirable.

Another important point that should be made is personal safety. Glass mirror by itself installed into direct hung gridwork presents a possible safety hazard if impacted by anything (e.g.—tip of a mop handle, etc.). Please note as per glass industry standards, shatter-resistant is the term used when a self-adhesive vinyl (contact paper) is adhered to the back side of a mirror. In a standard vertical installation this is acceptable, if the mirror is inadvertently broken, the contact paper holds the broken pieces in alignment with the unbroken area. The gravitational forces are working with the contact paper (parallel to the thickness) to keep the unit intact. But, in a horizontal or ceiling application, this will not work. If a mirror is broken in a horizontal installation, the gravitational attraction is perpendicular to the thickness. It is working to pull the mirror apart. There is no way that the contact paper itself can hold the horizontal mirror together. It becomes a personal safety hazard. Image-Safe TM panels, as shown in the pictures, does hold the horizontal installation together, even after being struck four times with a hammer.

Substitution of mirrors made of non-glass substances has been tried. Reflective acrylic plastic and mylar-faced mirror tiles are known, and they help reduce weight and breakage problems, but they have distortion and rapidly discolor from aging. They are softer than glass and also get scratches on the surface when they are cleaned (glass does not scratch easily when cleaned). Also, cleaning acrylic and mylar panels creates a static charge that aids attraction of dust and dirt particles (glass mirror when cleaned does not build a static charge). Acrylic and mylar are far inferior to glass as mirrors.

The present invention accordingly provides a mirror construction which combines the advantages of a glass mirror (distortionless reflected images, high resistance to discoloration due to aging or exposure to light or atmospheric attack) with none of the safety disadvantages of a horizontal installation of glass and with high degrees of fire-resistance and acoustical absorption, in tile-sized panels for ease of shipping, handling and installation. Even if constructed in accordance with the invention panels are impacted and cracked, they stay intact. A panel which was deliberately impacted with a hammer in four places, remained intact and personally safe.

It has been found that the construction of the ceiling tile of the present invention is uniquely applicable for outdoor use, such as for the ceiling of an outdoor portico. One reason for this is that with a weatherproof sealant around the edges of each mirrored panel, to reduce or eliminate weather-induced deterioration of the silvered back of the mirror, the ceiling tile composite is highly resistant to environmental attack and damage. Another reason the present ceiling tile is remarkably adapted for outdoor use is that its weight, approximately 2.5 pounds per square foot, is above the traditionally accepted minimum weight of 2 pounds per square foot for an unrestrained exterior lay-in panel. For both reasons stated, comparison may be had with a prior art ceiling panel constructed of plated steel, which is subject to rusting or pitting in exterior use, and which is stamped from 0.10" steel, making it too light in weight to resist wind uplift. The prior art panel is Classique, manufactured by Chicago Metallic Corp. An acceptable waterproof sealant for use around the edges of the present ceiling tile composite is Sprayway ® No. 209 mirror edge sealant, a spray-on material, Sprayway, Inc., Addison, Ill. An acceptable adhesive for the ceiling tile composite for outdoor use is Henry ® #430 referred to herein.

In summary, the present invention combines into a bonded structure a water-felted mineral fiberboard, a glass mirror and a latex- or rubber-base or epoxy adhesive, with a hung gridwork provided for support along the edges of each structural element.

The present invention is commercially sold under the name Image-Safe TM, Island Reflections TM, Trademark of Intername County Building Materials Corp. of Deer Park, Long Island, N.Y.

DESCRIPTION OF THE DRAWING

In the drawing,

FIG. 1 is a perspective view of the ceiling tile structural element of the present invention.

FIG. 2 is an enlarged fragmentary edge-view of the structural element of the present invention.

FIG. 3 is a exploded view of the structural element of the present invention.

FIG. 4 is an edge-view, partly in cross-section, of the structural element and the hung gridwork support of the present invention.

DESCRIPTION OF A PREFERRED EMBODIMENT

With reference to the drawing, the ceiling tile composite 10 of the present invention is a structural element comprising a bonded combination of a shock and heat retardant means 12, preferably mineral fiberboard, reflective means 14, preferably a glass mirror and bonding means 16, preferably an adhesive, therebetween.

Mineral fiberboard 12 is preferably a water felted mineral composition acoustical ceiling panel having specific characteristics of at least one substantially planar but fissured surface 18, a minimum density of approximately one pound per square foot of area covered in order to comply with Underwriters Laboratories Inc. (U.L. Labs) classified acoustical material time design fire tests, and compliance with other fire ratings. The fissures on or in said surface 18 are preferably uniform and non-directional.

Acceptable commercially-available mineral fiberboard for use with the present invention are USG Auratone ® Firecode ® panels in Omni-Fissured pattern (USG is United States Gypsum Company, Chicago, Ill.), Armstrong Minaboard ® FireGuard panels, Cortega pattern (Armstrong World Industries, Inc., Lancaster, Pa.) and Celotex ® Hytone ™ Protectone ® panels, Mosaic or ND Fissuretone patterns (Celotex Building Products Division, The Celotex Corporation, Tampa, Fl.).

Mirror 14 is preferably a double-thick decorative glass having a nominal thickness of ⅛ inch. Other thicknesses, or color-tinted glass, may be used depending on availability and application. Glass itself is non-combustible.

Adhesive 16 is preferably a rubber- or latex-base epoxy waterproof composition which is non-flammable when fully cured and which is adapted for mirror use so as to be nondegradable with respect to the silvered or reflective side of the mirror. Suitable commercially available rubber base adhesives are Sta-Stuck ™ Mirror Bond, Specialty Chemicals Company, Division of Continental Chemical and Coatings Corporation, Woburn, Mass., and Ultra/Bond ™ Mirror Mastic, C. Gunther Company, Cary, Ill. Suitable latex base adhesives are Henry ® #430 non-flammable clear Thin-Spread adhesive, The W.W.Henry Company, Huntington Park, Calif., and Miracle ® clear set #420 floor tile adhesive, Miracle Adhesives Corporation, Bellmore, Long Island, N.Y. A suitable epoxy-adhesive is Poly-Com Bond 2, a two-component epoxy structural adhesive available in liquid form (advantageous for high volume production) and in gel form (for trowel-spread low volume use) from Polymer Compounds, Hauppauge, Long Island, N.Y.

Rubber base adhesives are gun (cartridge) grade, and are suitable for low volume production. The application of this type of adhesive must follow a prescribed repeat pattern with a specific amount per course. Latex base adhesives are brush or roller grade, and are suitable for high volume production. Using a textured paint roller makes the application of the adhesive extremely easy, and the quantity of adhesive is not as critical.

Adhesive 16, when appropriately applied to bond mirror 14 to mineral fiberboard substrate 12, enters the fissures of fissured surface 18 during application, curing or both. The strength of the resulting bond is thereby enhanced by reason of the increased surface area of substrate 12 to which adhesive 16 attaches. Moreover, substantially to the extent that adhesive 16 fills in what would otherwise be a void formed by a fissure against mirror 14, there is also greater bonded surface area on the bonded side 20 of mirror 14.

The combination as aforesaid has advantages which the individual parts of the combination do not have separately. Mirror 12 is rendered more shatter-resistant, whether the shattering is a result of heat shock from fire or mechanical shock from an object striking its surface. It is believed that the reason mirror 12 becomes more heat and shock resistant is that both heat and shock are absorbed, or distributed over a wider area, by mineral fiberboard substrate 12. If mirror 12 does crack through, the pieces will tend to be held in place by adhesive 16, rather than fall on unsuspecting persons below. Moreover, if cracking is due to heat of fire, cracking of mirror 12 does not open up holes in the ceiling or wall formed by structural element 10 to allow fire and smoke to reach thereabove or spread therebeyond.

When installed as a suspended ceiling, structural element 10 is intended to be supported by a suspension system having direct hung gridwork 22 of inverted T exposed double web design having, as a minimum, ASTM classification for intermediate duty. Mirror 12 rests on gridwork 22 so that structural element 10 is in compression rather than in tension, aiding the permanence of the bond of adhesive 16.

Structural element 10 of the present invention provides long-lasting scratch-resistant decorative beauty of glass-mirrored ceilings and walls with structural and fire-retardant properties.

In typical dimension, ¾-inch thick and nominal 2 feet by 2 feet by 4 feet panels (actual 23¾ inches × 23¾ inches and 23¾ inches × 47¾ inches, respectively), structural element 10 constructed and suspended as aforesaid is intended to comply with current Underwriters Laboratories Inc. classified acoustical material time design fire tests. The flame spread rating of the substrate mineral fiberboard is 25. The composite Image-Safe ™ panels were subjected to the same flame spread test by Underwriters Laboratories Inc., in Northbrook, Ill., by their fire protection department in a "preliminary investigation" for classification. The flame spread for the composite Image-Safe ™ panels was 21.1 for a standard glass mirrored panel (a better than 15% reduction in flame spread) and a flame spread of 0.0 for a tempered mirror panel which applicant considers is a phenomenal rating (U.L. File #R3623, Project #89NH26, Tests #1 and #2 conducted on Feb. 2, 1989). Heretofore only two types of lay in ceiling panels have ever attained a flame spread rating of 0.0, asbestos-cement panels (which are no longer available), and ceramic-faced panels (which are high humidity panels).

While the foregoing is illustrative of a preferred embodiment, other embodiments may be had within the teachings hereof.

What is claimed is:

1. A ceiling tile composite, consisting of:
   a. reflective means, said reflective means comprising a glass mirror,
   b. shock and heat retardant means, said shock and heat retardant means comprising mineral fiberboard having at least one substantially planar fissured surface, and
   c. bonding means, said bonding means comprising an adhesive layer directly bonding said reflective means to the fissured surface of said shock and heat retardant means, the adhesive of said adhesive layer being selected from the group consisting of latex-base and epoxy adhesives.

2. A ceiling tile composite in accordance with claim 1, wherein said bonding means at least partially enters the fissures of said substantially planar fissured surface.

3. A ceiling composite in accordance with claim 1, wherein said bonding means is selected from the class consisting of a latex-base adhesive, a rubber-base adhesive and an epoxy adhesive.

4. A ceiling tile composite in accordance with claim 3, additionally comprising edge sealant means, said edge sealant means sealing the edges of said reflective means.

* * * * *